Jan. 6, 1925.
E. M. CARR
1,522,414
DIRECTION INDICATING SIGNAL
Filed April 30, 1924     2 Sheets-Sheet 1
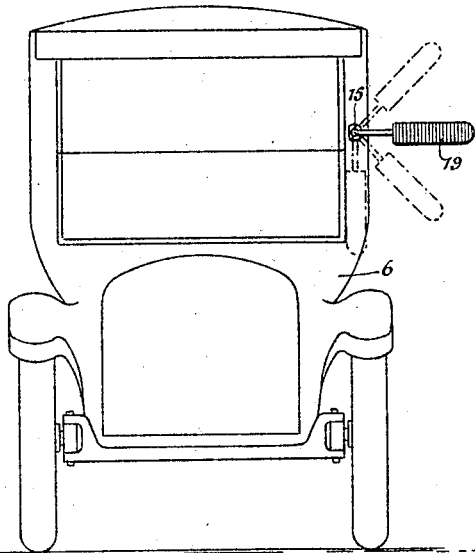
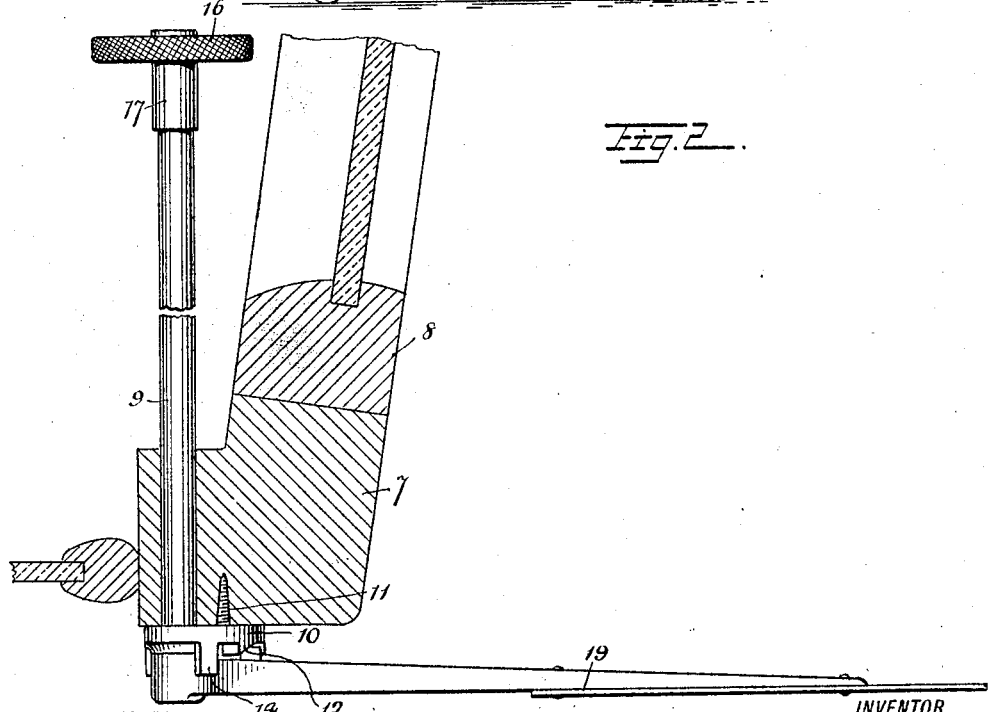

Jan. 6, 1925. 1,522,414
E. M. CARR
DIRECTION INDICATING SIGNAL
Filed April 30, 1924 2 Sheets-Sheet 2
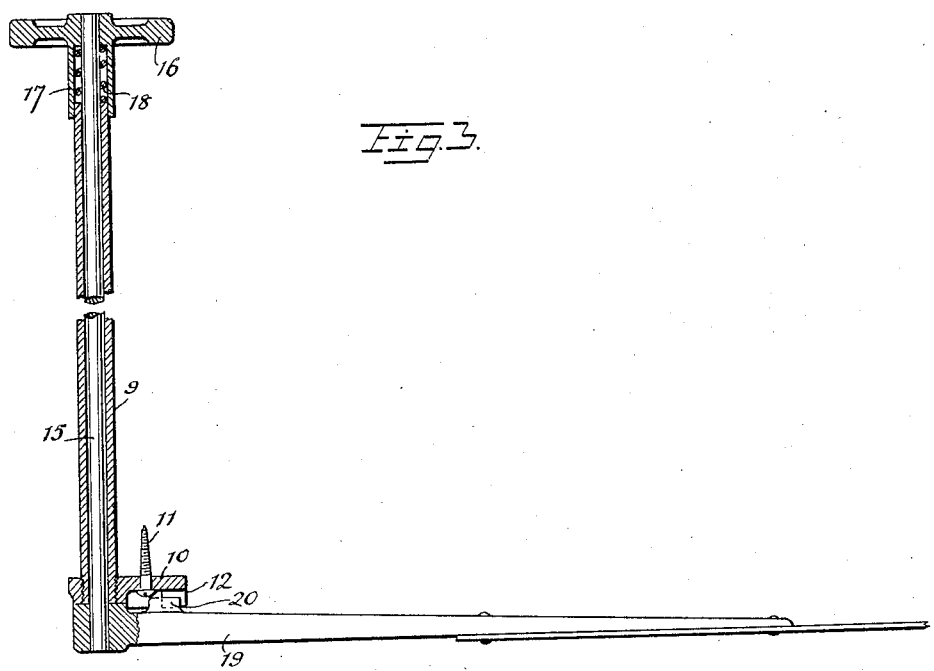
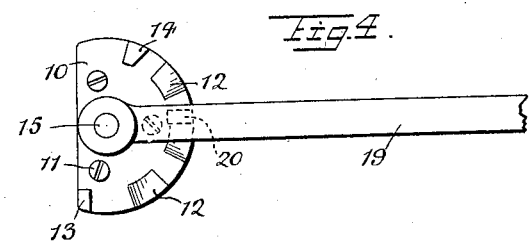
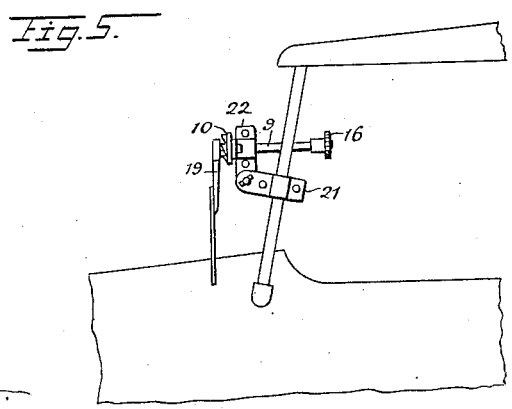
INVENTOR
E. M. CARR
BY 
ATTORNEYS Patented Jan. 6, 1925.

1,522,414

UNITED STATES PATENT OFFICE.

EMORY M. CARR, OF EVANSVILLE, INDIANA.

DIRECTION-INDICATING SIGNAL.

Application filed April 30, 1924. Serial No. 709,996.

*To all whom it may concern:*

Be it known that I, EMORY M. CARR, a citizen of the United States, and a resident of Woodmere, Evansville, in the county of Vanderburg and State of Indiana, have invented a new and improved Direction-Indicating Signal, of which the following is a full, clear, and exact description.

This invention relates to improvements in direction indicating signals for vehicles, and has for one of its objects to provide an improved signaling device of simple construction which may be readily applied to vehicles and easily and quickly manipulated to indicate to other traffic or pedestrians the intentions of the driver of the vehicle.

The above and other objects will appear more clearly from the following detailed description, when taken in connection with the accompanying drawings, which illustrate preferred embodiments of the inventive idea.

In the drawings—

Figure 1 is a front elevation of a motor vehicle of the closed type showing the invention applied thereto and the various operative positions of the signal being shown in full and dotted lines;

Figure 2 is an enlarged horizontal section through a portion of the vehicle showing the signaling device in plan view;

Figure 3 is a fragmentary longitudinal section through the signaling device;

Figure 4 is a fragmentary elevational view showing the means for retaining the signaling arm in various adjusted positions; and Figure 5 is a side elevation of a slightly different form of the invention showing its application to the wind shield of a vehicle.

Referring particularly to Figures 1 to 4, the numeral 6 indicates a motor vehicle, the body frame 7 having a door 8 which is the door usually placed alongside the driver's seat.

The signaling device comprises a sleeve 9 having its forward end extended horizontally through the frame 7 of the vehicle adjacent the driver's seat. Threaded upon the forward or outer end of the sleeve 9 is a plate 10 which is also secured to the frame by screws 11, the outer face of the plate being provided with ratchet teeth 12 and stops 13 and 14 for a purpose which will presently appear.

Mounted for rotation and longitudinal movement in the sleeve 9 is a shaft 15, the inner or rear end of which is secured to a small wheel or knob 16 having a boss 17 which receives the adjacent end of the sleeve 9. Interposed between the wheel 16 and the adjacent end of the sleeve 9 and enclosed within the boss 17 is a coil spring 18 which normally acts to force the wheel and consequently the shaft 15 rearwardly. The forward end of the shaft 15 projects beyond the plate 10 and has secured thereto a signaling arm 19 which may be adjusted to various positions by rotation of the shaft 15. Adjacent its point of connection with the shaft 15 the arm 19 is provided with a latching projection 20 engageable with any one of the teeth 12 and also with the stops 13 and 14 to limit the movements of the arm in either direction. The projection 20 is normally held in engagement with the teeth 12 or with the stops 13 and 14 by the spring 18 so that the arm 19 will be yieldably maintained in any of its adjusted positions.

The signaling arm is made to assume a normal or non-indicating position by rotating the shaft 15 until the arm engages the lower stop 13, as indicated in dotted lines in Figure 1. Should the driver desire to signal that he is going to stop the car the wheel 16 and shaft 15 may be rotated from the normal position to the first dotted line position shown in Figure 1. In so doing the projection 20 will ride over the first tooth 12 which will cause a slight forward longitudinal movement of the shaft 15 in the sleeve 9 and after said projection has passed the tooth the spring 18 will force the shaft 15 and consequently the arm 19 rearwardly to engage the projection 20 with the tooth in such manner as to support the signaling arm in the position indicated and retain it in such position thereby permitting the operator to employ both hands in steering the vehicle. Likewise the signaling arm may be adjusted to the full line position or the other dotted line position shown in Figure 1 and when in such positions the arm will indicate left and right hand turns, respectively. When in the last-mentioned dotted line position the arm will engage the stop 14 thus limiting the movement of said arm.

For the purpose of mounting the signaling device on the wind shield of a vehicle instead of in the frame thereof as described, there is provided a pair of arms 21 and 22, the former being connected to the wind shield in any preferred manner and the latter being pivotally connected to the arm 21 and carrying the plate 10 and shaft 15 and associated parts so that the shaft may be adjusted to a horizontal position regardless of the angle of the wind shield. The construction and operation of the signaling device is otherwise the same as that described above.

What is claimed is:

1. A direction indicating device for vehicles including a plate capable of attachment to a vehicle, a signaling arm having rotary and lateral movements with respect to said plate, cooperating means on said plate and arm for retaining the latter in various adjusted positions, a shaft having one end secured to said arm for rotating the same, a wheel on the other end of the shaft for rotating said shaft, a sleeve carried by said plate and surrounding said shaft, and a spring interposed between said wheel and sleeve for yieldably maintaining said cooperating means in operative relation and permitting longitudinal movement of the shaft in said sleeve whereby said arm may be moved laterally with respect to the plate to disengage said cooperating means.

2. An indicating device for vehicles, comprising a plate adapted to be secured to a vehicle, a sleeve secured to the plate, a shaft having its ends extending through the sleeve, a signal arm on one end of the shaft, interengaging locking means on the arm and plate, a wheel on the other end of the shaft and having a boss into which the end of the sleeve extends, and a coil spring in the boss of the wheel and engaging the end of the sleeve.

3. An indicating device for vehicles, comprising a plate adapted to be secured to a vehicle and provided with teeth and stops, a sleeve secured to the plate, a shaft having its ends extending through the sleeve, a signal arm on one end of the shaft and adapted to engage the teeth and stops of said plate, a wheel on the other end of the shaft and having a boss into which the end of the sleeve extends, and a coil spring in the boss of the wheel and engaging the end of the sleeve.

EMORY M. CARR.